US011413771B2

(12) United States Patent
Zhang et al.

(10) Patent No.: US 11,413,771 B2
(45) Date of Patent: Aug. 16, 2022

(54) CABLE HARNESS MANAGEMENT MODULE AND A ROBOT

(71) Applicant: ABB Schweiz AG, Baden (CH)

(72) Inventors: Shimin Zhang, Shanghai (CN); Kangjian Wang, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 124 days.

(21) Appl. No.: 16/539,268

(22) Filed: Aug. 13, 2019

(65) Prior Publication Data
US 2019/0366562 A1  Dec. 5, 2019

Related U.S. Application Data

(63) Continuation of application No. PCT/CN2017/082529, filed on Apr. 28, 2017.

(51) Int. Cl.
  *B25J 19/00* (2006.01)
  *B25J 9/00* (2006.01)
  *B25J 9/10* (2006.01)

(52) U.S. Cl.
  CPC ......... *B25J 19/0041* (2013.01); *B25J 9/0009* (2013.01); *B25J 9/104* (2013.01); *B25J 19/0075* (2013.01)

(58) Field of Classification Search
  CPC . B25J 19/0029; B25J 19/0041; B25J 19/0025
  See application file for complete search history.

(56) References Cited

U.S. PATENT DOCUMENTS 4,427,170 A * 1/1984 Truninger ............ B25J 19/0029
  174/86
6,153,828 A * 11/2000 Murata .................. H02G 11/00
  174/50
(Continued)

FOREIGN PATENT DOCUMENTS

CN   203185360 U   9/2013
CN   103375642 A   10/2013
(Continued)

OTHER PUBLICATIONS

State Intellectual Property of the P.R. China, International Search Report & Written Opinion issued in corresponding Application No. PCT/CN2017/082529, dated Jan. 24, 2018, 12 pp.
(Continued)

*Primary Examiner* — Joseph Brown
(74) *Attorney, Agent, or Firm* — Greenberg Traurig, LLP (57) ABSTRACT

A cable harness management module includes a base plate and a rotatable element which matches with and can rotate relative to the base plate. The base plate and the rotatable element form a space for receiving the cable harness including a first end and a second end. The cable harness management module has a first fastening member for fastening the first end onto the base plate, and a second fastening member for fastening member for fastening the second end onto the rotatable element. The cable harness can reel on or off the rotatable element when the rotatable element rotates with the robot joint. The cable harness management module may also include a mounting member for removably mounting the base plate to the robot joint. The cable harness management module protects the cable harness inside the compact space from abrasion and lengthen the lifetime of the cable harness.

19 Claims, 8 Drawing Sheets

(56) References Cited

U.S. PATENT DOCUMENTS

| | | | |
|---|---|---|---|
| 8,863,607 B2* | 10/2014 | Kume | F16L 3/01 |
| | | | 74/490.02 |
| 9,142,946 B2* | 9/2015 | Krager | H02G 3/32 |
| 2004/0179900 A1* | 9/2004 | Uematsu | H02G 11/00 |
| | | | 405/183.5 |
| 2010/0313694 A1* | 12/2010 | Aoki | B25J 19/0029 |
| | | | 74/490.02 |
| 2015/0068350 A1* | 3/2015 | Kirihara | B25J 19/0025 |
| | | | 74/490.05 |
| 2016/0311120 A1* | 10/2016 | Goto | B25J 19/0029 |

FOREIGN PATENT DOCUMENTS

| | | | | |
|---|---|---|---|---|
| CN | 103802088 A | 5/2014 | | |
| CN | 104470688 A | 3/2015 | | |
| DE | 3715118 A1 | 11/1988 | | |
| DE | 4105650 C1 * | 4/1992 | ......... | B25J 19/0029 |
| EP | 0217336 A1 * | 4/1987 | ......... | B25J 19/0029 |
| JP | H02160498 A | 6/1990 | | |
| JP | H0796488 A | 4/1995 | | |
| JP | H07156093 A | 6/1995 | | |
| JP | 2009044809 A | 2/2009 | | |
| JP | 4680965 B2 | 5/2011 | | |
| TW | 200529996 A | 9/2005 | | |
| WO | 8703529 A1 | 6/1987 | | |

OTHER PUBLICATIONS

Office Action dated Dec. 1, 2021 from related Chinese Patent Application No. 201780086076.2 and its English translation.
English translation of JPH07156093.
English translation of JPH02160498.
English translation of CN103375642.
English translation of CN104470688.
English translation of DE3715118.
English translation of JPH0796488.
English translation of JP2009044809.
English translation of TW200529996.
English translation of WO87/03529.
Liu Guangfu, et al.; "Green Design and Green Manufacturing"; Mechanical Industry Press; pp. 61-64; Apr. 2000 (English Abstract).
China Second Office Action; issued by the China National Intellectual Property Administration; regarding corresponding patent application Serial No. CN 2017800860762; dated Mar. 21, 2022; 10 pages (with English Translation).

* cited by examiner

CABLE HARNESS MANAGEMENT MODULE AND A ROBOT

FIELD OF THE INVENTION

The non-limiting and exemplary embodiments of the present disclosure generally relate to the field of industrial robots, and more particularly relate to a cable harness management module for a robot joint and a robot including at least one robot joint having such a management module therein.

BACKGROUND OF THE INVENTION

This section introduces aspects that may facilitate a better understanding of the disclosure. Accordingly, the statements of this section are to be read in this light and are not to be understood as admissions about what is in the prior art or what is not in the prior art.

Nowadays, robots are widely used in many fields such as welding, assembling, conveying, paint spraying, laser machining, and etc. An industrial robot usually includes more than one robot joint. Generally, the robot joint includes a fixed part and a rotatable part which rotates about an axis relative to the fixed part. The cable harness runs and extends in the robot joint to provide power for driving the rotatable part or transmit a control signal for controlling the rotatable part.

Due to frequent movements of the robot joint, the cable harness is very likely to be abraded or even broken, and thus it requires providing a cable harness with suitable toughness and a proper cable harness protection solution, to reduce damage possibility of the cable harness. In the existing solution, the cable harness on the robot joint is protected by some nets, which, however, is quite insufficient. Thus, there is a need to improve the cable harness management in the art.

SUMMARY OF THE INVENTION

Various embodiments of the present disclosure mainly aim at providing a solution for fault detection in line protection for a power transmission system to solve or at least partially mitigate at least a part of problems in the prior art. Other features and advantages of embodiments of the present disclosure will also be understood from the following description of specific embodiments when read in conjunction with the accompanying drawings, which illustrate, by way of example, the principles of embodiments of the present disclosure.

According to a first aspect of the present disclosure, there is provided a cable harness management module for a robot joint. The cable harness management module may include a base plate and a rotatable element. The rotatable element matches with the base plate and can rotate relative to the base plate, wherein at least the base plate and the rotatable element form a space for receiving the cable harness including a first end and a second end. The cable harness management module may further include a first fastening member for fastening the first end onto the base plate; and a second fastening member for fastening the second end onto the rotatable element. The cable harness can reel on the rotatable element or unreel therefrom when the rotatable element rotates with the robot joint. The cable harness management module may also include a mounting member for removably mounting the base plate to the robot joint.

In an embodiment of the present disclosure, the cable harness management module may further include a cover for at least partially covering the base plate and the rotatable element, wherein the space for receiving the cable harness is further limited by the cover.

In another embodiment of the present disclosure, at least one of the first fastening member and the second fastening member may include a strap.

In a further embodiment of the present disclosure, at least one of the first fastening member and the second fastening member may further include an elastic part with holes for the cable harness.

In a still further embodiment of the present disclosure, the rotatable element may include a rotatable hollow shaft with a collar for guiding reeling and unreeling of the cable harness on the rotatable hollow shaft.

In another embodiment of the present disclosure, the rotatable hollow shaft may have an opening or cut on its periphery for exposing a terminal of the second end.

In a further embodiment of the present disclosure, the cover may include an opening or cut for exposing a terminal of the first end.

In a still further embodiment of the present disclosure, at least one of the first fastening member and the second fastening member may be configured to removably fasten a corresponding one of the first end and the second end.

In a yet further embodiment of the present disclosure, the cable harness management module may further include the cable harness.

In another embodiment of the present disclosure, the cable harness management module may further include at least one tube for conveying any of air, oil and water.

In a further embodiment of the present disclosure, wherein the base plate may have an arc edge or cut corresponding to a periphery of the rotatable element.

In a still further embodiment of the present disclosure, wherein the rotatable element may extend through an opening in the base plate.

In another aspect of the present disclosure, there is further provided a robot having at least one robot joint with a cable harness management module of any of the first aspect.

With embodiments of the present disclosure, a mechanism for management the cable harness is provided, which could guide movement of the cable harness inside a compact space, thus protect the cable harness from abrasion and lengthen the lifetime of the cable harness.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or signs are used to designate like or equivalent elements. The drawings are illustrated for facilitating better understanding of the embodiments of the disclosure and not necessarily drawn to scale, in which.

DETAILED DESCRIPTION OF EMBODIMENTS

Hereinafter, the principle and spirit of the present disclosure will be described with reference to illustrative embodiments. It shall be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just means that there is an electrical connection between two elements and they can be connected either directly or indirectly, unless explicitly stated to the contrary.

In the following description and claims, unless defined otherwise, all technical and scientific terms used herein have the same meaning as commonly understood by one of ordinary skills in the art to which this disclosure belongs.

As mentioned in Background, due to frequent movements of the robot joint, the cable harness is very likely to be abraded or even broken and thus it requires providing a cable harness with suitable toughness and a proper cable harness protection solution to reduce damage possibility of the cable harness. However, in the existing solution, the cable harness on the robot joint is protected only by some nets, which is quite insufficient. Thus, in the present disclosure, there is provided an improved cable harness management solution for providing enhanced protection for the cable harness. Hereinafter, reference will be made to FIGS. 2 to 15 to describe the cable harness management solution as provided therein, but before that, an example 6-axis industrial robot in the art will be first described with reference to FIG. 1 to make the skilled in the art better understanding state of the art.

Figure 1:
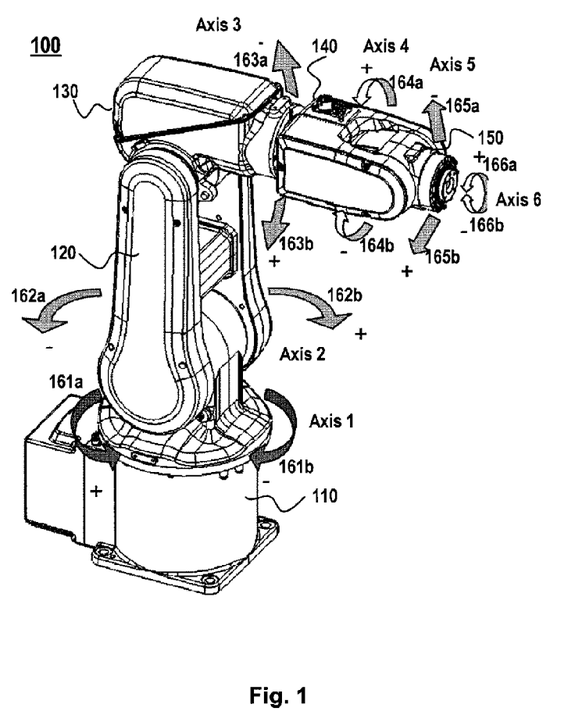
FIG. 1 schematically illustrates an example 6-axis/joint industrial robot in the art.

FIG. 1 schematically illustrates an example 6-axis/joint industrial robot 100 in the art. As illustrated in FIG. 1, the robot 100 includes a base 110, an upper arm 120, an elbow 130, a fore arm 140 and a wrist 150. The upper arm 120 is rotatably attached with the base 110, and the elbow 130 is rotatably attached with the upper arm 120. The fore arm 140 is rotatably attached with the elbow 130 and the wrist 150 is further rotatably attached with the fore arm 140. On the wrist 150, it may be further installed a hand (not show) or a tool for performing desired processing.

On the top of the base 110, there is arranged a first axis (indicated as Axis 1), around which the upper arm 120 as a whole can could rotate relative to the base toward inside or outside of the page, as illustrated by arrows 161a, 161b. Between the upper arm 120 and the first axis, there is arranged a second axis (indicated as Axis 2), around which the upper arm 120 could swing toward the right side or the left side of the paper, as illustrated by arrows 162a, 162b. Between the upper arm 120 and the elbow 130, there is arranged a third axis (indicated as Axis 3), around which the elbow 130 could rotate up and down, as illustrated by arrows 163a, 163b. Between the elbow 130 and the fore arm 140, there is arranged a fourth axis (illustrated as Axis 4), around which the fore arm 140, as a whole, could rotate relative to the elbow 130 toward inside or outside of the page, as illustrated by arrows 164a, 164b. Between the fore arm 140 and wrist 150, there is a fifth axis, around which the wrist 150 can rotate up and down. At the end of the wrist 150, there is arranged a sixth axis (indicated as Axis 6), around which the hand or tool to be attached could rotate in directions as illustrated by arrows 166a, 166b.

It shall be appreciated that although the 6-axis industrial robot is described in FIG. 1, it is only presented for illustrative purposes and the industrial robot can also include more or less axes, for example, 1-axis, 2-axis, 3-axis, 4-axis, 5-axis, or 7-axis or even more. The cable harness management solution proposed herein can be applied onto any type of industrial robot with any numbers of axes.

Next, reference will also be made to FIGS. 2 to 12 to describe an example cable harness management module according to an embodiment of the present disclosure. It shall be appreciated that the example cable harness management module is only given to illustrate the principle of the cable harness management solution proposed herein and the present disclosure is not limited thereto and it is possible make a lot of modification, deletion, addition or alteration without departing the spirit of the present disclosure as taught herein.

FIGS. 2 to 5 respectively illustrate diagrams of an example cable harness management module in an isometric view, in a front view, in a back view and in a bottom view according to an embodiment of the present disclosure.

Figure 2:
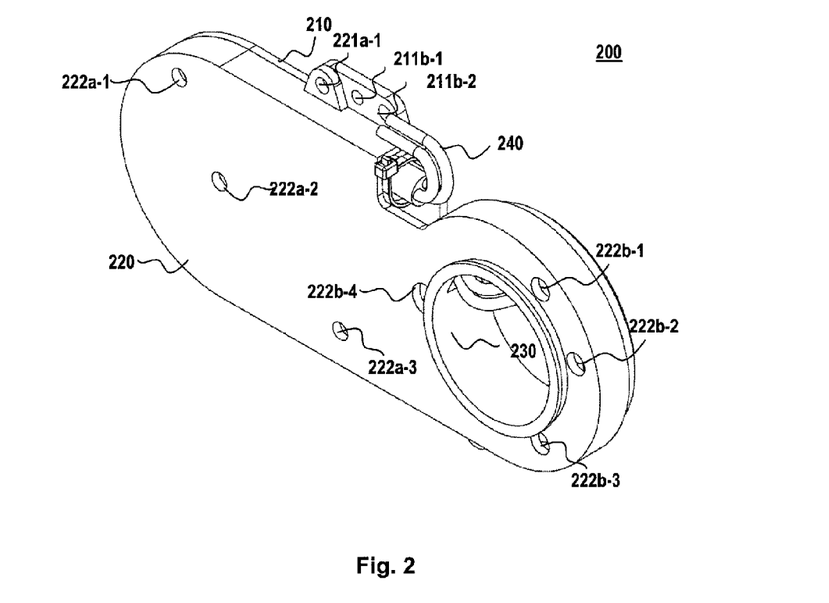
FIG. 2 schematically illustrates a diagram of an example cable harness management module in an isometric view according to an embodiment of the present disclosure.

Reference is first made to FIG. 2. as illustrated, the example cable harness management module 200 includes a base plate 210, a cover 220, and a rotatable element 230. In the cable harness management module 200, it can receive a cable harness 240.

The base plate 210 is a static plate to be installed onto a fixed part of a robot joint. The base plate 210 can supports the cable harness 240 and the cover 220 and the input end of the cable harness 240 is fixed onto the base plate 210.

The cover 220 is a covering element or a cap at least partially covering the base plate 210 and the rotatable element 230. The cover 220 is shaped to cover the base plate 210 and the rotatable element 230. In FIG. 2, the cover 220 is illustrated as a covering element almost covering the base 210 and the rotatable element 230 completely; however, the present disclosure is not limited thereto. The cover 220 can take any other form as long as it can function to further limit the space for receiving the cable harness. For example, it can only cover some parts of the base plate 210 and/or the rotatable element 230, or take a form of a plate with holes or grids. In some case, the plate provide an enough space limitation, the cover 220 can even be omitted.

On the main surface of the cover 220, there are one or more holes 222a-1, 222a-2, and 222a-3 for filling, for example, lubricant, etc. There are also one or more holes 222b-1, 222b-2, 222b-3, and 222b-4, which can expose mounting holes on the rotatable element 230 so that the rotatable element 230 can be installed onto the rotatable part of the robot joint.

The rotatable element 230 is an element which is to be installed onto the rotatable part of the robot joint and can rotate with regard to the base plate 210 which is a static support element. The cable output end of the cable harness 240 is to be fixed to the rotatable element 230. On the rotatable element 230, there are provided one or more mounting holes 231a-1, 231a-2, 231a-3 and 231a-4 (illustrated in FIG. 4). Fastening elements can be used with the one or more mounting holes 231a-1, 231a-2, 231a-3 and 231a-4 to install the rotatable element 230 onto the fixed part of the robot joint.

On the base plate 210 and the cover 220, there are some mounting members for removably mounting the cable harness management module onto a robot joint or assembling the base plate 210 and the cover 220 together, which might be described hereinafter in details further with reference to FIGS. 3 to 5.

Figure 3:
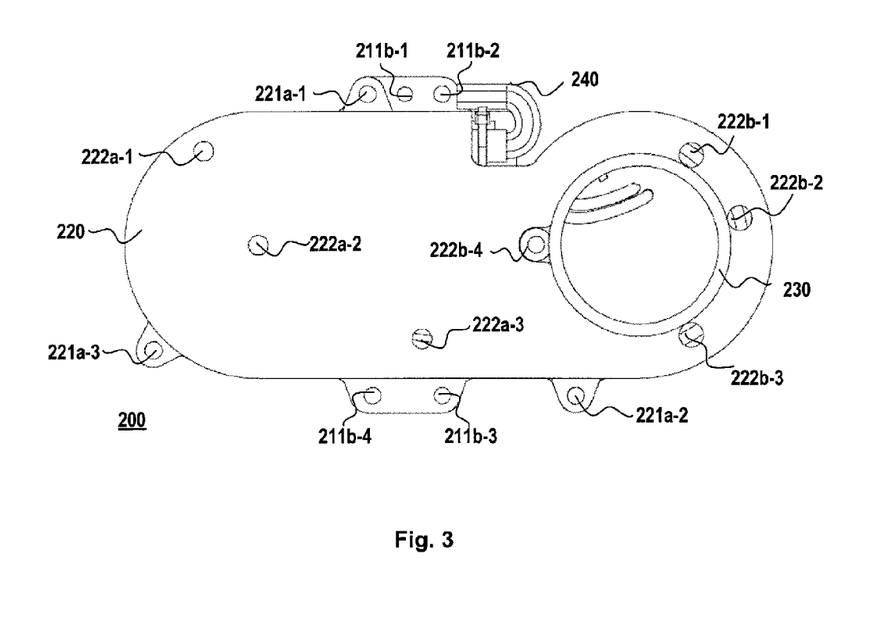
FIG. 3 schematically illustrates a diagram of an example cable harness management module in a front view according to an embodiment of the present disclosure.
Figure 4:
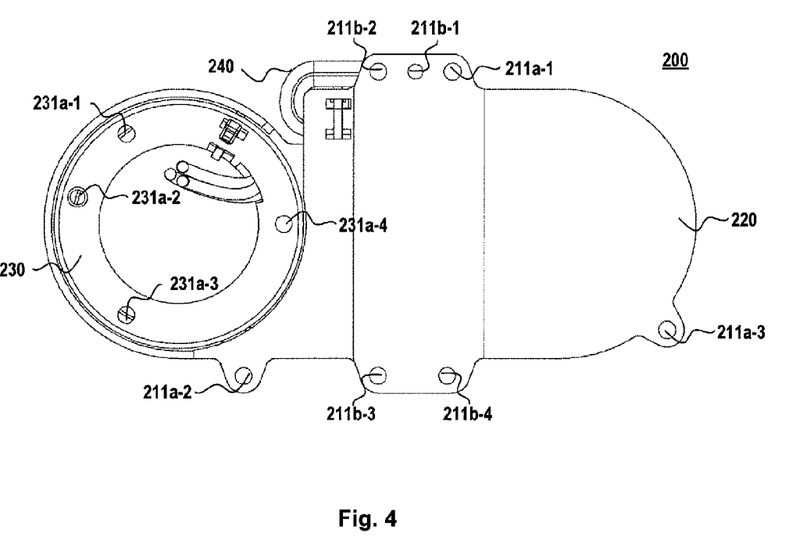
FIG. 4 schematically illustrates a diagram of an example cable harness management module in a back view according to an embodiment of the present disclosure.
Figure 5:
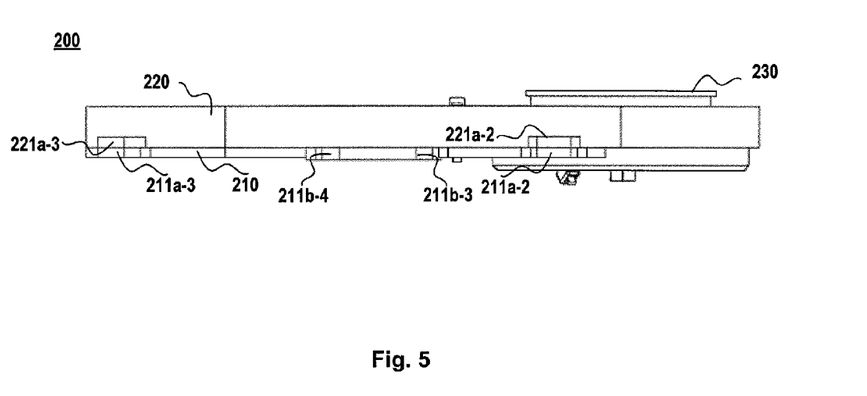
FIG. 5 schematically illustrates a diagram of an example cable harness management module in a bottom view according to an embodiment of the present disclosure.

As illustrated in FIGS. 3 to 5, on the cover 220, there are provided one or more mounting members 221a-1, 221a-2, and 221a-3. Each of mounting members 221a-1, 221a-2, and 221a-3 is in a form of mounting hole and is an integral part of the cover 220. In other implementations, the mounting elements can be attached onto the cover 220 by for example welding etc.

On the base plate 210, there are also provided mounting members and reference can be made to FIGS. 3 to 5. As illustrated, there are mounting members 211a-1, 211a-2, and 211a-3 (illustrated in FIG. 4) and 211b-1, 211b-2, 211b-3 and 211b-4 (illustrated in FIGS. 3 to 5). Amongst these mounting members, the mounting members 211a-1, 211a-2, and 211a-3 are mounting members to be used together with mounting members 221a-1, 221a-2, and 221a-3 on the cover 220 (illustrated in FIG. 5) so as to assembly the base plate 210 and the cover 220 together; while mounting members 211b-1, 211b-2, 211b-3 and 211b-4 are used to install the base plate 210 and thus the cable harness management module 200 to the robot joint.

Similar to mounting members 221a-1, 221a-2, and 221a-3, all of these mounting members 211a-1, 211a-2, 211a-3, 211b-1, 211b-2, 211b-3 and 211b-4 are in form of mounting holes and are integral parts of the base plate 220. It can also be appreciated that the mounting elements 211a-1, 211a-2, 211a-3, 211b-1, 211b-2, 211b-3 and 211b-4 can also be attached onto the base plate 210 by for example welding etc.

It can be understood that mounting members on the base plate 210 and the cover 220 are not limited to mounting holes, it is possible to uses other form of mounting elements, such as a snap fit structure, etc.

Hereinafter, internal arrangement of the example cable harness management module 200 will be described with reference to FIGS. 6 to 9, which further illustrate diagrams of an example cable harness management module with the cover removed in an isometric view, in a front view, in a back view and in a bottom view according to an embodiment of the present disclosure.

Figure 6:
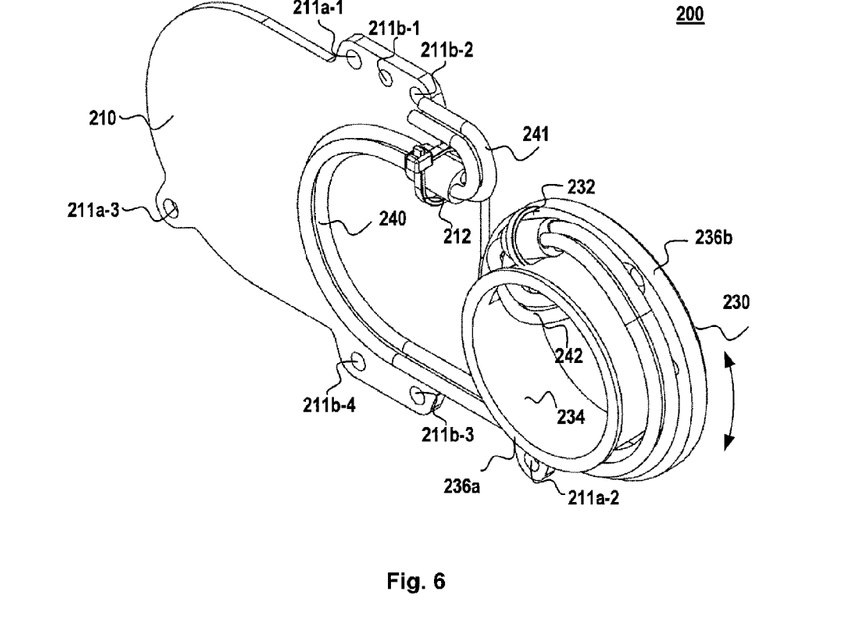
FIG. 6 schematically illustrates diagrams of an example cable harness management module with its cover removed in an isometric view according to an embodiment of the present disclosure.

Reference is made to FIG. 6, and as illustrated, the base plate 210 is a static support plate, which is substantially flat and to be installed to the fixed part of the robot joint. It shall be appreciated that the shape of the base plate is only an example and in real application, the base plate can be shaped and sized in according the available space within the robot joint. For example, in another embodiment of the present disclosure, the base plate may have a side wall protruded from its periphery.

The cable harness 240 is a bundle of cables comprising a plurality of cables (illustrated as three cables as an example). The cable harness 240 has a cable input end 241 and a cable output end 242. The cable input end 241 is fasten onto the base plate 210 by means of a fastening member 212, while the cable output end 242 is fasten onto the periphery of the rotatable element 230 by another fastening member 232.

The rotatable element 230 is to be installed on the rotatable part of the robot joint and thus can rotate relative to the base plate 210. The base plate 210 and the rotatable element 230 form a space for receiving the cable harness 240.

The cable harness 240 can reel on the rotatable element 230 or unreel therefrom when the rotatable element 230 rotates with the robot joint (not shown). Thus, the cable harness 240 shall have a suitable length so that there is a suitable allowance when the rotatable element 230 reaches its maximum rotation stroke and at the same time it will not cause a space problem when the cable harness completely unreels from the rotatable element 230.

Figure 7:
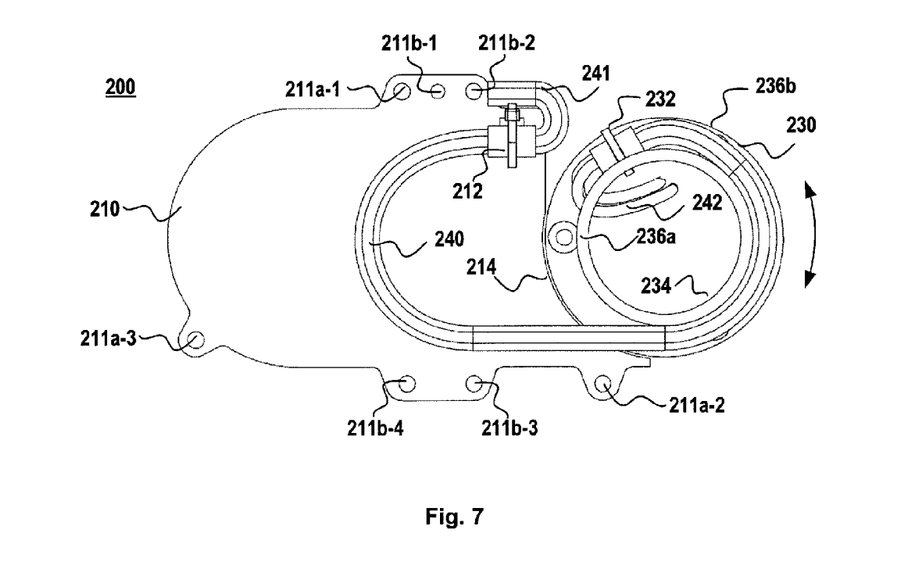
FIG. 7 schematically illustrates diagrams of an example cable harness management module with its cover removed in a front view according to an embodiment of the present disclosure.
Figure 8:
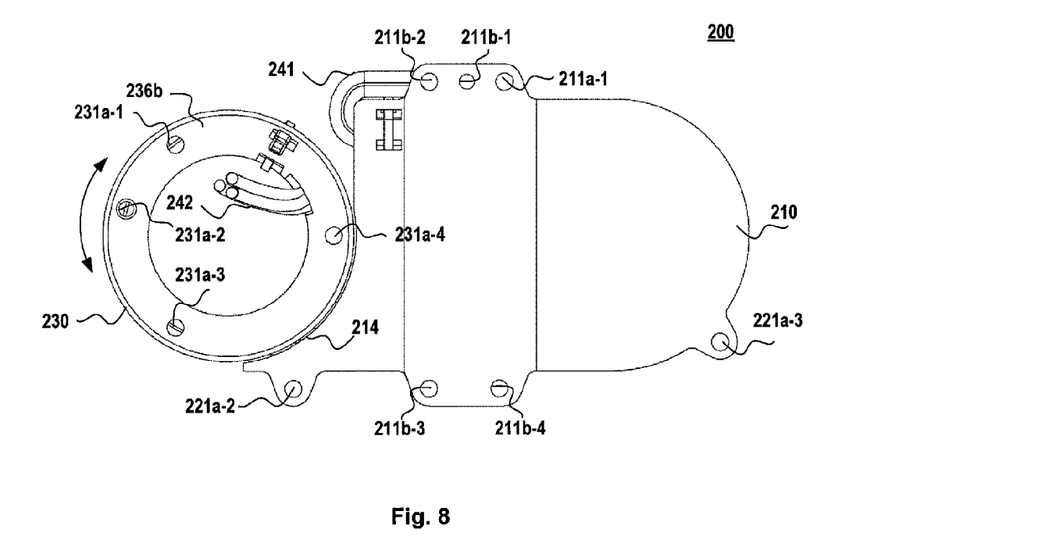
FIG. 8 schematically illustrates diagrams of an example cable harness management module with its cover removed in a back view according to an embodiment of the present disclosure FIG. 9 schematically illustrates a diagram of an example cable harness management module with its cover removed in a bottom view according to an embodiment of the present disclosure.

To ensure rotation of the rotatable element 230 with the rotatable part of the robot join, the rotatable element 230 shall match with the base plate 210 so that the rotation movement of the rotatable element 230 will not be interfered. As illustrated in FIG. 7 and FIG. 8, the base plate 210 can have an arc edge or cut 214 corresponding to a periphery of the rotatable element 230. However, the present disclosure is not limited thereto. It is also possible to provide an opening in the base plate 210, through which the rotatable element 230 can extend.

Figure 9:
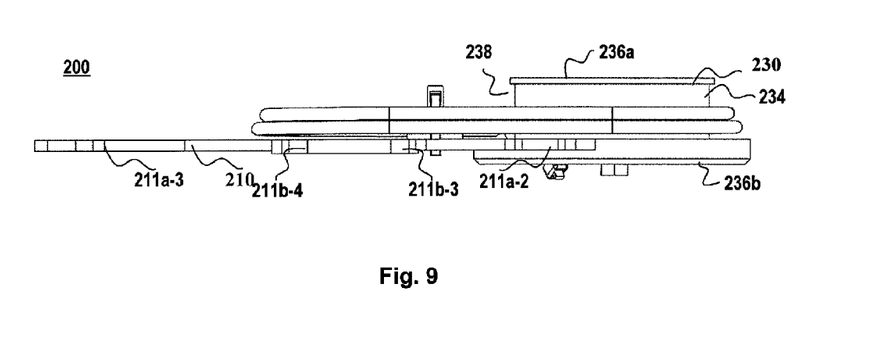

In addition, the rotatable element 230 is a rotatable hollow shaft 234 with a collar 236a and a collar 236b. The collar 236 is configured to guide reeling and unreeling of the cable harness 240 on the rotatable hollow shaft 234, as illustrated in FIGS. 6, 7 and 9. The collar 236b has one or more mounting members 231a-1, 231a-2, 231a-3 and 231a-4 provided thereon, which are used to mount the rotatable element 230 onto the rotatable part of the robot joint. The collar 236a, 236b form a groove 238 (illustrated in FIG. 9) together with the periphery of the rotatable hollow shaft 234. In such a way, it is possible to well guide the reeling and unreeling of the cable harness on the rotatable hollow shaft 234. However, it can be understood that the rotatable element is not limited to the hollow shaft, it is possible to assume other form, for example a part of the shaft is a hollow and other part of the shaft is solid as long as it can provide a mounting element and a cable outlet.

The fastening members 212, 232 can be any form as long as they can fix the cable input and output ends 241, 242 onto the base plate 210 and rotatable element 230 respectively. The example structure of the fastening members 212 and 232 will be described hereinafter with reference to FIGS. 10 and 11.

Figure 10:
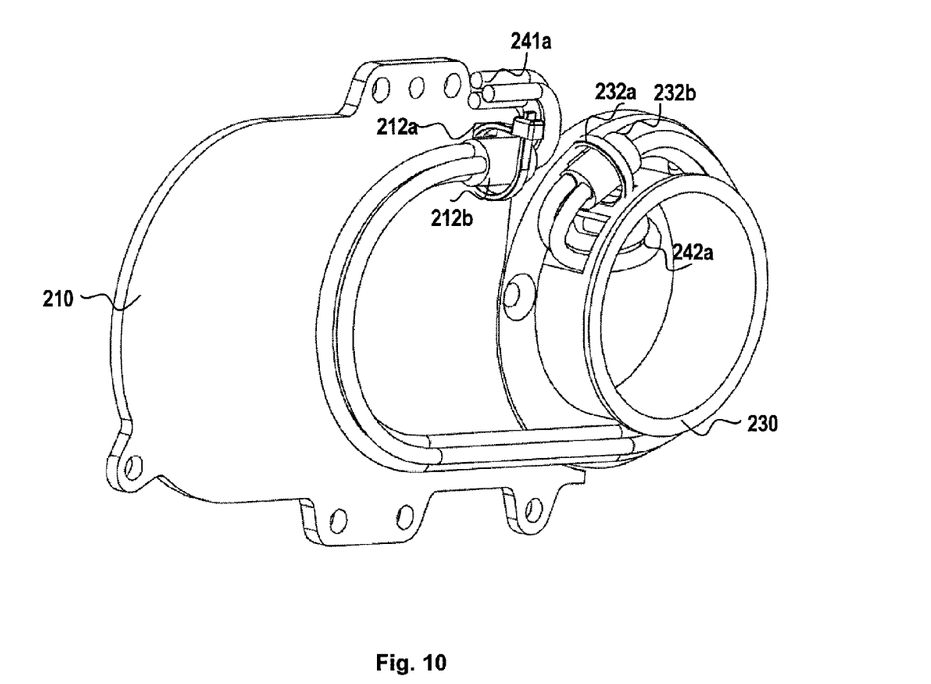
FIG. 10 schematically illustrates a diagram showing fastening elements of an example cable harness management module in an isometric view according to an embodiment of the present disclosure.
Figure 11:
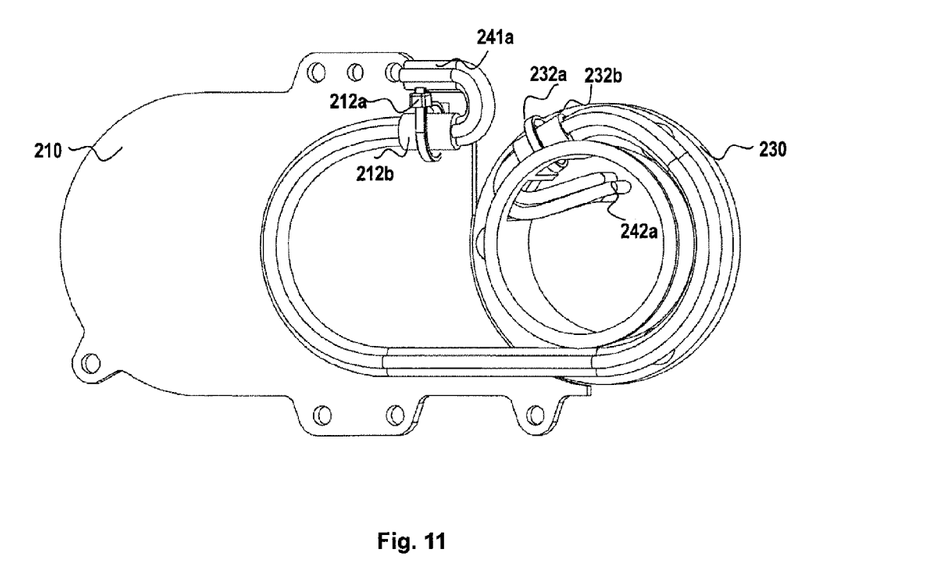
FIG. 11 schematically illustrates a diagram showing fastening elements of an example cable harness management module in a front view according to an embodiment of the present disclosure.

As illustrated in FIG. 10 and FIG. 11, in this embodiment, at least one of fastening members 212, 232 comprises a strap. As illustrated, the fastening member 212 comprises a strap 212a, which can be attached to the base plate 210 in a removable manner. Likely, the fastening member 232 comprises a strap 232a, which can be attached to the rotatable element 230 in a removable manner as well. By pulling one end of the strap 212a, 232a which goes through a ring of its other end, the cable input and output ends 241, 242 can be fixed onto the base plate 210 and the rotatable element 230 respectively.

Preferably, it may also provide an elastic part with holes for the cable harness for each of the fastening members 212, 232. As illustrated, the fastening member 212 comprises an elastic part 212b, which is provided with three holes for the three cables in the cable harness; the fastening member 232 comprises an elastic part 232b provided with three holes for the three cables in the cable harness. As illustrated, the strap 212a will fasten the cable input end 241 onto the base plate 210 at the part of the cable harness 240 which is protected by the elastic part 212b, and the strap 232a will fasten the cable output end 242 onto the rotatable element 230 at the part of the cable harness 240 which is protected by the elastic part 232b. In such a way, the cable harness may be further protected by the elastic parts 212b and 232b and at the same time the fasten performance of the fastening members 212, 232 can be enhanced.

The fastening members 212, 232 can be configured to removably fasten a corresponding one of the first end and the second end and thus the cable harness can be easily replaced when it is damaged.

Figure 12:
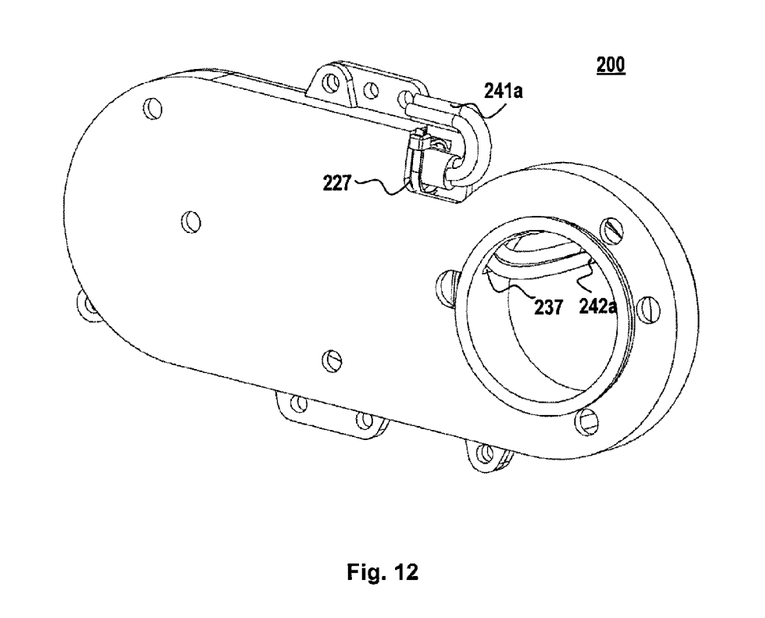
FIG. 12 schematically illustrates a diagram showing a cable inlet and a cable outlet an example cable harness management module in an isometric view according to an embodiment of the present disclosure.

In addition, the cover 210 may further include an opening or cut for exposing a terminal 241a of the cable input end 241. The rotatable hollow shaft may also have an opening or cut on its periphery for exposing a terminal 242a of the cable input end 242. Reference can be made to FIG. 12 to describe the opening or cut for the cable input and output ends 241 and 242.

As illustrated in FIG. 12, the terminal 241a of the cable input end 241 can be exposed by an opening or cut 227 in the cover 220. The opening or cut 227 can also be called as a cable inlet. Thus, the terminal 241a of the cable input end 241 can extend out and electrically connected with a cable harness in previous robot joint. Similarly, the terminal 242a of the cable output end 242 can be exposed by an opening or cut 237 in the periphery of the rotatable element 230. The opening or cut 237 can also be called as a cable outlet. Through the pending or cut 237, the terminal of the cable output end 242 can extend out and be electrically connected with a cable harness within the rotatable part.

In addition, the cover 220 may further include an opening or cut for exposing a terminal 241a of the cable input end 241. The rotatable hollow shaft may also have an opening or cut on its periphery for exposing a terminal 242a of the cable input end 242. Reference can be made to FIG. 12 to describe the opening or cut for the cable input and output ends 241 and 242.

Figure 13:
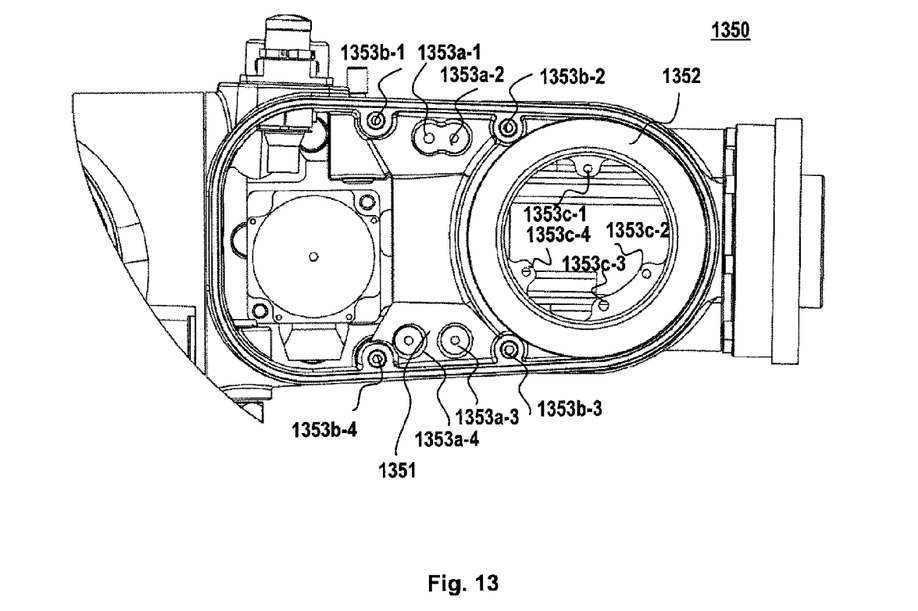
FIG. 13 schematically illustrates a robot joint of an industrial robot having no cable harness management module installed therein according to an embodiment of the present disclosure.
Figure 14:
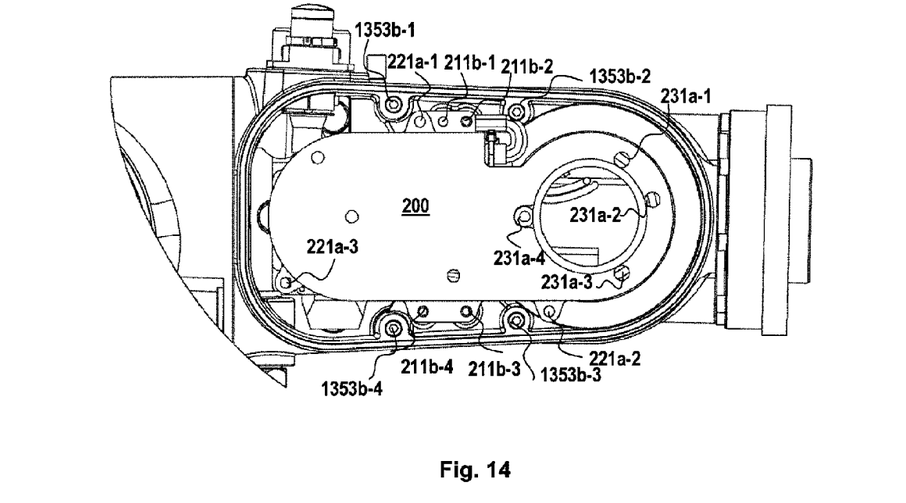
FIG. 14 schematically illustrates a robot joint of an industrial robot having a cable harness management module installed therein according to an embodiment of the present disclosure.

Next, reference will further made to FIGS. 13 to 14 to describe installation of the example cable harness management module according to an embodiment of the present disclosure.

FIG. 13 schematically illustrates a robot joint 1350 of an industrial robot having no cable harness management module installed therein according to an embodiment of the present disclosure. The robot joint 1350 illustrated in FIG. 13 is a robot joint at for example Axis 5 of a six-axis robot. The robot joint 1350 comprises a fixed part 1351 and a rotatable part 1352. In addition, on the robot joint 1350, there are also provided mounting members 1353a-1, 1353a-2, 1353a-3, 1353a-4, 1353b-1, 1353b-2, 1353b-3, 1353b-4, 1353c-1, 1353c-2, 1353c-3, and 1353c-4. The mounting members are all in a form of mounting holes. However, similar to the mounting members on the base plate 210 and the cover 220, it is possible to uses other form of mounting elements, such as a snap fit structure, etc.

Amongst those mount members, the mounting members 1353a-1, 1353a-2, and 1353a-3, and 1353a-4 can be used with mounting members 211b-1, 211b-2, 211b-3 and 211b-4 on the base plate 210 to mount the base plate and thus the cable harness management module onto the robot joint. On the other hand, the mounting members 1353b-1, 1353b-2, 1353b-3, 1353b-4 will be used with corresponding mounting members on a joint cover (illustrated in FIG. 15) so as to cover the inner components within the robot joint. In addition, the mounting members 1353c-1, 1353c-2, 1353c-3, 1353c-4 can be used with the mounting member 231a-1, 231a-2, 231a-3, and 231a-4 to mount the rotatable element 230 onto the rotatable part 1352.

As illustrated in FIG. 14, the mounting member 231a-1, 231a-2, 231a-3, and 231a-4 on the rotatable element 230 can be aligned with mounting member 1353c-1, 1353c-2, 1353c-3, and 1353c-4 one the rotatable part 1352 of the robot joint 1350. By means of fastening members like screws, the rotatable 230 can be installed onto the rotatable part 1320 of the robot joint so that the rotatable element can rotate with the rotatable part 1320. The mounting members 221a-1, 221a-2, and 221a-3 on the cover 220, and the mounting members 211a-1, 211a-2, and 211a-3 on the base plate 210 can be aligned with each other so the cover 220 and the base plate 210 can be assembled together. The mounting members 211b-1, 211b-2, 211b-3 and 211b-4 on the base plate 210 can be aligned with the mounting members 1353b-1, 1353b-2, 1353b-3, and 1353b-4 on the rotatable part 1352. By means of fastening members like screws, the base plate 210 and thus the cable harness management module 200 can be mounted on the fixed part 1352 of the robot joint.

Figure 15:
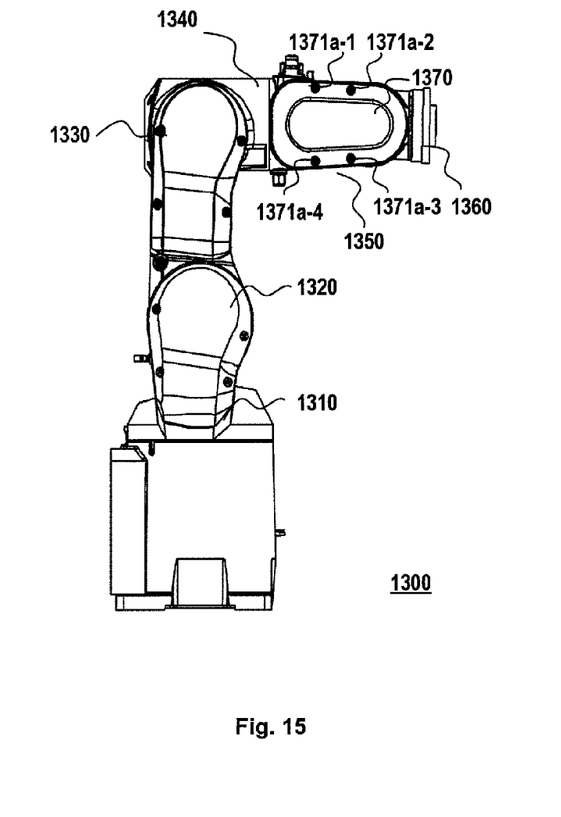
FIG. 15 schematically illustrates an industrial robot having at least one robot joint with a cable harness management module according to an embodiment of the present disclosure.

After the fastening members are fastened, the terminals of the cable harness can be electrically connected with terminals of other cable harness. Then, the mounting members 1371c-1, 1371c-2, 1371c-3, 1371c-4 on the joint cover 1370 can be aligned with mounting members 1353b-1, 1353b-2, 1353b-3, 1353b-4 on the robot joint 1350 and fastening members like screws can be used to install the joint cover 1370 onto the robot joint 1350, as illustrated in FIG. 15. Thus, the installation of the cable harness management module 200 is finished and the robot joint is read to use.

In the present disclosure, the cable harness management module is a standalone module separated from the robot joint and can be installed thereon in a removable manner. With such a cable harness management module, the cable harness can be well protected during the rotation of the rotatable part of the robot joint, the possibility and degree of abrasion is substantially reduced and thus the lifetime of the cable harness can be lengthened.

It shall be appreciated that although in the above description, the cable harness management module 200 is used for Axis 5, i.e., the robot joint 1350, the present disclosure is not limited therein. In fact, the cable harness management module 200 can also be shaped and sized so as to be applied in any other robot joint like 1310, 1320, 1330, 1340, 1360, or other robot joints in a robot with more or less robot joints.

It shall be appreciated that although in the above description, the cable harness management module is illustrated as containing the cable harness; however the present disclosure is not limited thereto. In real application, the cable harness can also be provided as a separate assembly instead of together with the cable harness management module.

In addition, in a case the base plate has a wall protruded from its periphery, the opening or cut for exposing the terminal 241a of the cable harness 240 can be arranged on the wall.

Hereinabove, embodiments of the present disclosure have been described in details through embodiments with reference to the accompanying drawings. It should be appreciated that, while this specification contains many specific implementation details, these details should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A cable harness management module for a robot joint, comprising:
   a base plate having a flat surface defining a plane;
   a rotatable element intersecting the plane and laterally spaced from and adjacent to the base plate which matches with the base plate and can rotate relative to the base plate about an axis, wherein at least the base plate and the rotatable element form a space extending away from the axis and parallel to the flat surface of the base plate for receiving a cable harness, the cable harness including a first end and a second end and a portion between the first and second ends disposed in the space parallel to the flat surface of the base plate, wherein the cable harness portion within the space can move within the space parallel to the flat surface of the base plate;
   a first fastening member for fastening the first end onto the base plate;
   a second fastening member for fastening the second end onto the rotatable element, wherein the portion of the cable harness can reel on the rotatable element or unreel therefrom within the space parallel to the flat surface of the base plate when the rotatable element rotates with the robot joint; and
   a mounting member for removably mounting the base plate to the robot joint.

2. The cable harness management module of claim 1, further comprising:
   a cover for at least partially covering the base plate and the rotatable element, wherein the space for receiving the cable harness is further limited by the cover.

3. The cable harness management module of claim 2, wherein the cover includes an opening or cut for exposing a terminal of the first end.

4. The cable harness management module of claim 2, wherein at least one of the first fastening member and the second fastening member comprises a strap.

5. The cable harness management module of claim 4, wherein at least one of the first fastening member and the second fastening member further comprises an elastic part with holes for the cable harness.

6. The cable harness management module of claim 2, wherein the rotatable element comprises a rotatable hollow shaft with a collar for guiding reeling and unreeling of the cable harness on the rotatable hollow shaft.

7. The cable harness management module of claim 6, wherein the rotatable hollow shaft has an opening or cut on its periphery for exposing a terminal of the second end.

8. The cable harness management module of claim 2, wherein the cover includes an opening or cut for exposing a terminal of the first end.

9. The cable harness management module of claim 1, wherein at least one of the first fastening member and the second fastening member comprises a strap.

10. The cable harness management module of claim 9, wherein at least one of the first fastening member and the second fastening member further comprises an elastic part with holes for the cable harness.

11. The cable harness management module of claim 9, wherein the rotatable element comprises a rotatable hollow shaft with a collar for guiding reeling and unreeling of the cable harness on the rotatable hollow shaft.

12. The cable harness management module of claim 11, wherein the rotatable hollow shaft has an opening or cut on its periphery for exposing a terminal of the second end.

13. The cable harness management module of claim 1, wherein the rotatable element comprises a rotatable hollow shaft with a collar for guiding reeling and unreeling of the cable harness on the rotatable hollow shaft.

14. The cable harness management module of claim 13, wherein the rotatable hollow shaft has an opening or cut on its periphery for exposing a terminal of the second end.

15. The cable harness management module of claim 1, wherein at least one of the first fastening member and the second fastening member is configured to removably fasten a corresponding one of the first end and the second end.

16. The cable harness management module of claim 1, further comprising at least one tube for conveying any of air, oil and water.

17. The cable harness management module of claim 1, wherein the base plate has an arc edge or cut corresponding to a periphery of the rotatable element.

18. The cable harness management module of claim 1, wherein the rotatable element extends through an opening in the base plate.

19. A robot having at least one robot joint with the cable harness management module of claim 1.

* * * * *